United States Patent
Hsieh et al.

(10) Patent No.: US 7,344,294 B2
(45) Date of Patent: Mar. 18, 2008

(54) BACKLIGHT MODULE AND LIQUID CRYSTAL DISPLAY DEVICE USING THE SAME

(75) Inventors: Yu Chih Hsieh, Miao-Li (TW); Ming Chiang Yu, Miao-Li (TW); Chih Chia Yu, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 0 days.

(21) Appl. No.: 11/316,756

(22) Filed: Dec. 23, 2005

(65) Prior Publication Data

US 2006/0146577 A1    Jul. 6, 2006

(30) Foreign Application Priority Data

Dec. 31, 2004    (TW) ............................. 93221385 U

(51) Int. Cl.
*F21V 8/00*    (2006.01)

(52) U.S. Cl. .................. 362/633; 362/612; 362/634; 362/561

(58) Field of Classification Search ............... 362/633, 362/612, 631, 632, 634, 561; 349/58, 60, 349/65, 150
See application file for complete search history.

(56) References Cited

U.S. PATENT DOCUMENTS

| | | | |
|---|---|---|---|
| 5,654,779 A | | 8/1997 | Nakayama et al. ............ 349/58 |
| 6,068,381 A | * | 5/2000 | Ayres ......................... 362/633 |
| 6,880,953 B2 | | 4/2005 | Shin |
| 6,976,781 B2 | * | 12/2005 | Chu et al. ................... 362/633 |

FOREIGN PATENT DOCUMENTS

KR    2001035369 A  *  5/2001

* cited by examiner

*Primary Examiner*—Sharon Payne
(74) *Attorney, Agent, or Firm*—Wei Te Chung

(57) ABSTRACT

A backlight module (100) includes a light guide plate (56), a bottom tray (50) having a spring finger (506), a radiation element (59) disposed adjacent to the light guide plate, and a frame (55) receiving the light guide plate and the radiation element. The light guide plate includes a light incident surface (560), and a side surface (564) opposite to the light incident surface. An ear (566) is formed on the side surface, and the spring finger presses the light guide plate toward the radiation element. A distance between the radiation element and the light incident surface is thereby decreased or even eliminated. This enables the backlight module to provide improved brightness and uniformity of emitting luminance.

20 Claims, 4 Drawing Sheets

BACKLIGHT MODULE AND LIQUID CRYSTAL DISPLAY DEVICE USING THE SAME

FIELD OF THE INVENTION

The present invention relates to a backlight module and a liquid crystal display (LCD) device using the same, and more particularly to a backlight module with a spring finger.

GENERAL BACKGROUND

Liquid crystal displays are commonly used as display devices for compact electronic apparatuses, because they not only are very thin but also provide good quality images with little power consumption. The liquid crystals in a liquid crystal display do not emit any light themselves. The liquid crystals have to be lit by a light source so as to clearly and sharply display text and images. Thus, a backlight module for an LCD is generally needed.

FIG. 6 shows a schematic, top view of a conventional LCD 300. The LCD 300 includes a flexible printed circuit board (FPC) 310, a liquid crystal display panel 320, a plastic frame 330, two light emitting diodes (LEDs) 340 cooperatively serving as a light source, and a light guide plate 400.

The FPC 310 connects with the liquid crystal display panel 320, and includes a main circuit area 311 and a light source setting area 312. The light source setting area 312 extends from the main circuit area 311. The LEDs 340 are arranged on the light source setting area 312 of the FPC 310. The frame 330 includes a depressed portion 331, and the depressed portion 331 has two openings 332.

The LCD 300 can be assembled according to the following sequence: firstly, setting the light guide plate 400 inside the frame 330; secondly, putting the light source setting area 312 into the depressed portion 331, and placing the LEDs 340 into the openings 332; thirdly, attaching the main circuit area 311 to the frame 330 and the light guide plate 400; and finally, attaching the liquid crystal display panel 320 to the frame 330.

However, the above-mentioned conventional liquid crystal display has the following problems.

The sizes of the openings 332 may not accurately match the sizes of the LEDs 340, due to imprecise manufacturing. When this happens, small gaps exist between the LEDs 340 and the light guide plate 400 after assembly. These gaps may diminish the emitting luminance of the light guide plate 400.

FIG. 7 is a graph showing the negative impact of the above mentioned gaps on the effective utilization of the emitting luminance. X represents the distance between the LEDs 340 and a light incident surface (not labeled) of the light guide plate 400 in millimeters (mm), and Y represents the relative emitting luminance of the light guide plate 400 as a function of X. It can be seen that the greater the value of X, the lower the value of Y That is, the greater the gap, the lower the value of the relative emitting luminance.

What is needed, therefore, is a backlight module and a liquid crystal display device using the same that overcome the above-described deficiencies.

SUMMARY

In a preferred embodiment, a backlight module includes a light guide plate, a bottom tray having a spring finger, a radiation element disposed adjacent to the light guide plate, and a frame receiving the light guide plate and the radiation element. The light guide plate includes a light incident surface, and a side surface opposite to the light incident surface. An ear is formed on the side surface, and the spring finger presses the light guide plate toward the radiation element.

A liquid crystal display device includes a liquid crystal display panel, and the backlight module as described above.

The spring finger presses the light guide plate toward the radiation element, and thereby decreases or even eliminates a distance between the radiation element and the light incident surface of the light guide plate. This enables the backlight module to provide improved brightness and uniformity of emitting luminance.

Other advantages and novel features will become more apparent from the following detailed description when taken in conjunction with the accompanying drawings.

DETAILED DESCRIPTION OF PREFERRED EMBODIMENTS

Reference will now be made to the drawings to describe the preferred embodiments in detail.

Figure 1:
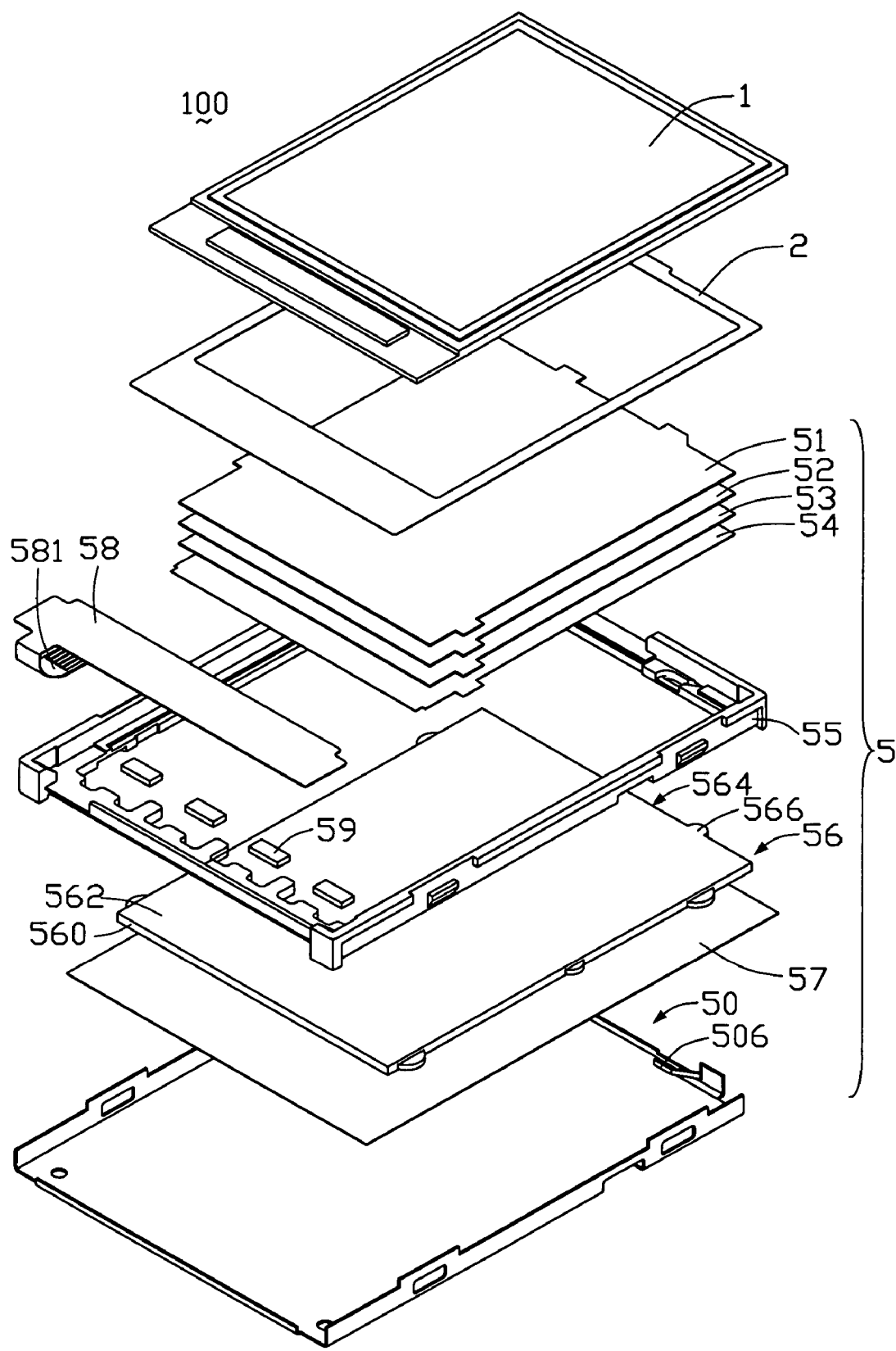
FIG. 1 is an exploded, isometric view of an LCD device according to a preferred embodiment of the present invention, the LCD device including a printed circuit board, a frame, a light guide plate, a reflective plate, a bottom tray, and LEDs.

FIG. 1 is an exploded, isometric view of an LCD device according to a preferred embodiment of the present invention. The LCD device 100 includes a liquid crystal display panel 1, a light cover plate 2, and a backlight module 5.

The backlight module 5 includes a first diffusion plate 51, a first brightness enhancement film (BEF) 52, a second brightness enhancement film 53, a second diffusion plate 54, a frame 55, a light guide plate 56, a reflective plate 57, and a bottom tray 50 arranged from top to bottom in that order. The backlight module 5 further includes a plurality of radiation elements 59, and a printed circuit board 58.

Figure 2:
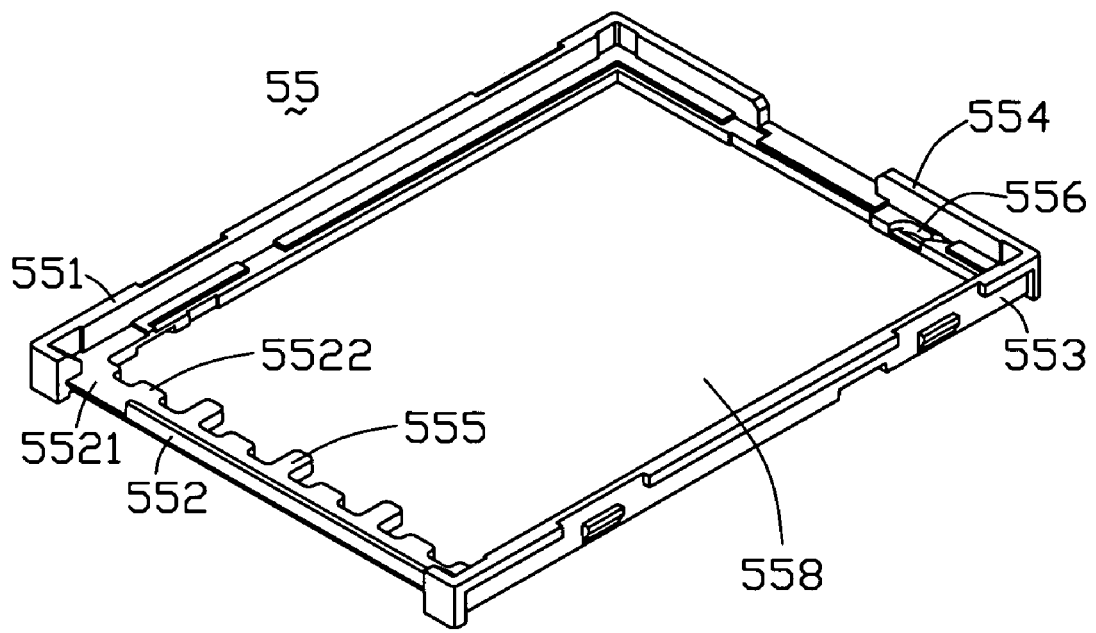
FIG. 2 is an isometric view of the frame of FIG. 1.

Referring to FIG. 2, the frame 55 is preferably made of plastic. The frame 55 includes a first side wall 551, a second side wall 552, a third side wall 553, a fourth side wall 554. The first side wall 551, the second side wall 552, the third side wall 553, and the fourth side wall 554 cooperatively define a space 558 therebetween. A through-hole 556 is commonly defined in the fourth side wall 554 and a portion of the frame 55 that adjoins the fourth side wall 554.

The second side wall 552 defines an opening 5521 at one end thereof. A plurality of protrusions 5522 and a plurality of partition arms 555 are formed along an inside surface of the frame 55 at the second side wall 552. The protrusions 5522 and the arms 555 are disposed parallel to each other, and extend into the space 558. A length of the arms 555 is greater than a length of the protrusions 5522. The radiation elements 59 can be respectively disposed in a series of spaces including spaces between two adjacent arms 555. That is, the radiation elements 59 can be arranged to abut the protrusions 5522 respectively.

The light guide plate 56 includes a light incident surface 560, a light emitting surface 562 adjoining the light incident surface 560, and a side surface 564 opposite to the light incident surface 560. The side surface 564 includes an ear 566 corresponding in position to the through-hole 556 of the frame 55.

Figure 3:
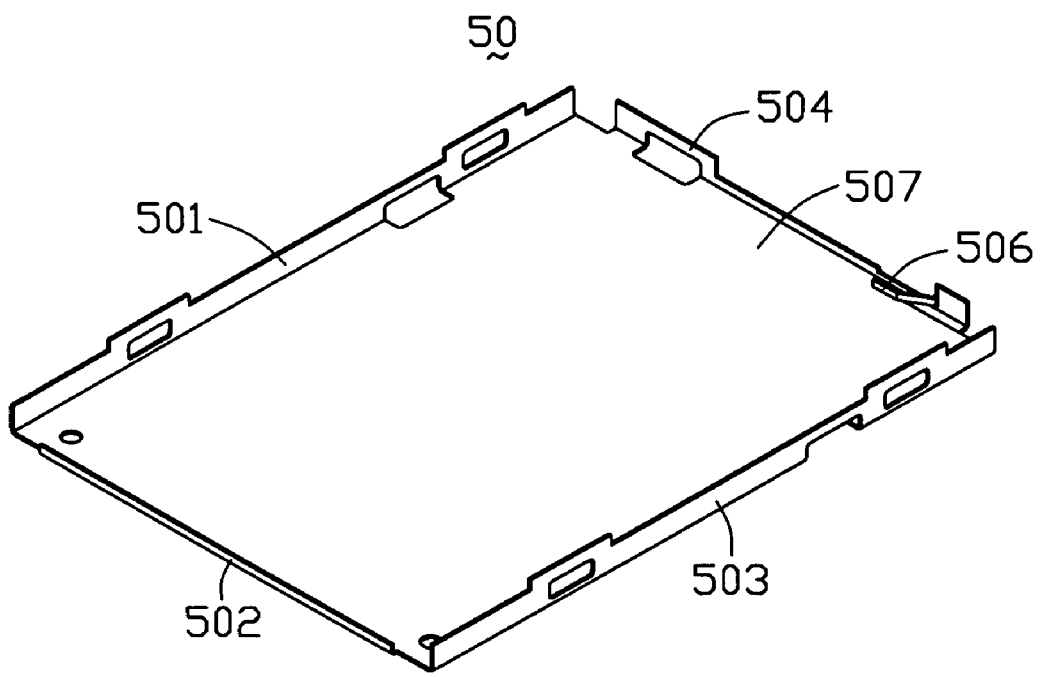
FIG. 3 is an isometric view of the bottom tray of FIG. 1.

As shown in FIG. 3, the bottom tray 50 includes a first side wall 501, a second side wall 502, a third side wall 503, a fourth side wall 504, and a bottom plate 507. The bottom plate 507 adjoins the first, second, third and fourth side walls 501, 502, 503 and 504. A spring finger 506 extends obliquely inwardly from an end portion of the fourth side wall 504. A shape of the spring finger 506 corresponds to a shape of the through-hole 556. The bottom tray 50 is preferably made of metal.

The printed circuit board 58 includes a connection strip 581 extending from a main body (not labeled) thereof. The radiation elements 59 are attached on the printed circuit board 58, and cooperatively serve as a light source. The radiation elements 59 are typically light emitting diodes (LEDs). Typically, the printed circuit board 58 is a flexible printed circuit.

In assembly, the light guide plate 56 is received in the space 558 of the frame 55. The printed circuit board 58 with the radiation elements 59 is received in the space 558 adjacent the second side wall 552, such that the printed circuit board 58 covers the arms 555 and the protrusions 5522. The radiation elements 59 are thus received in the series of spaces including the spaces between each two adjacent arms 555, such that the radiation elements 59 abut the incident surface 560 of the light guide plate 56. The frame 55 and the reflective plate 57 are received in the bottom tray 50. The spring finger 506 extends into the through-hole 556 and elastically presses the ear 566 of the light guide plate 56, thereby pushing the light guide plate 56 toward the radiation elements 59. The connection strip 581 of the printed circuit board 58 extends out from the frame 55 through the opening 5521. The second diffusion plate 54, the second brightness enhancement film 53, the first brightness enhancement film 52, and the first diffusion plate 51 are placed in turn on the emitting surface 562 of the light guide plate 56. The light cover plate 2 and the liquid crystal display panel 1 are placed in turn on the first diffusion plate 51.

Figure 4:
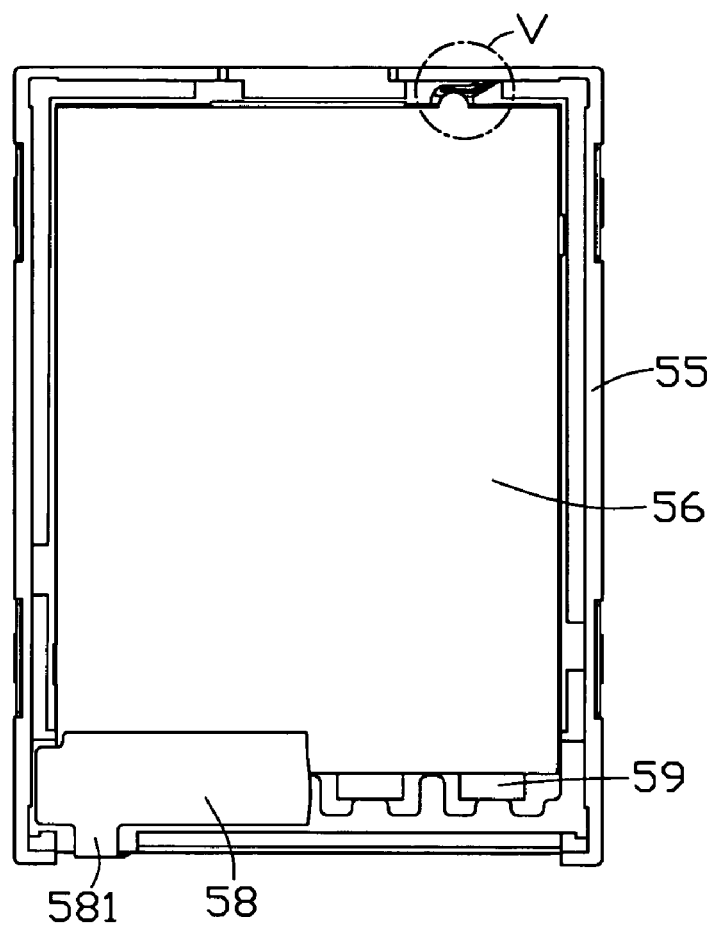
FIG. 4 is a top plan view of the printed circuit board, frame, light guide plate, reflective plate, bottom tray and LEDs of FIG. 1 assembled together, with the circuit board partially cut away to show two of the LEDs.
Figure 5:
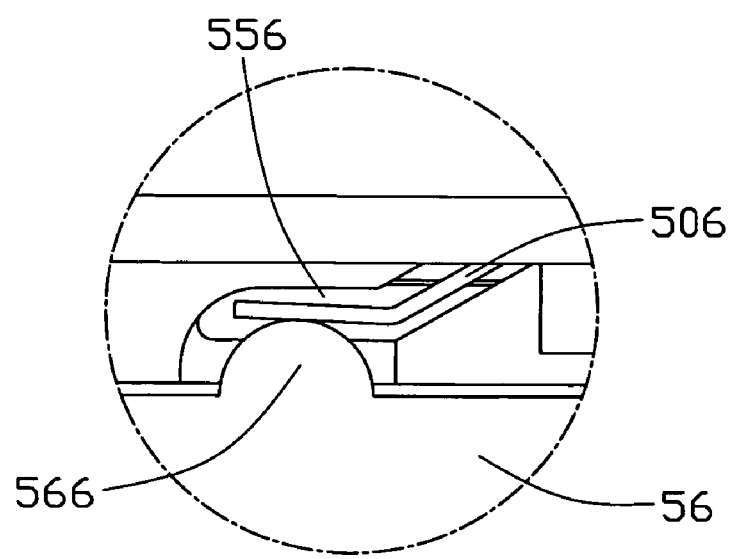
FIG. 5 is an enlarged view of a circled portion V of FIG. 4.
Figure 6:
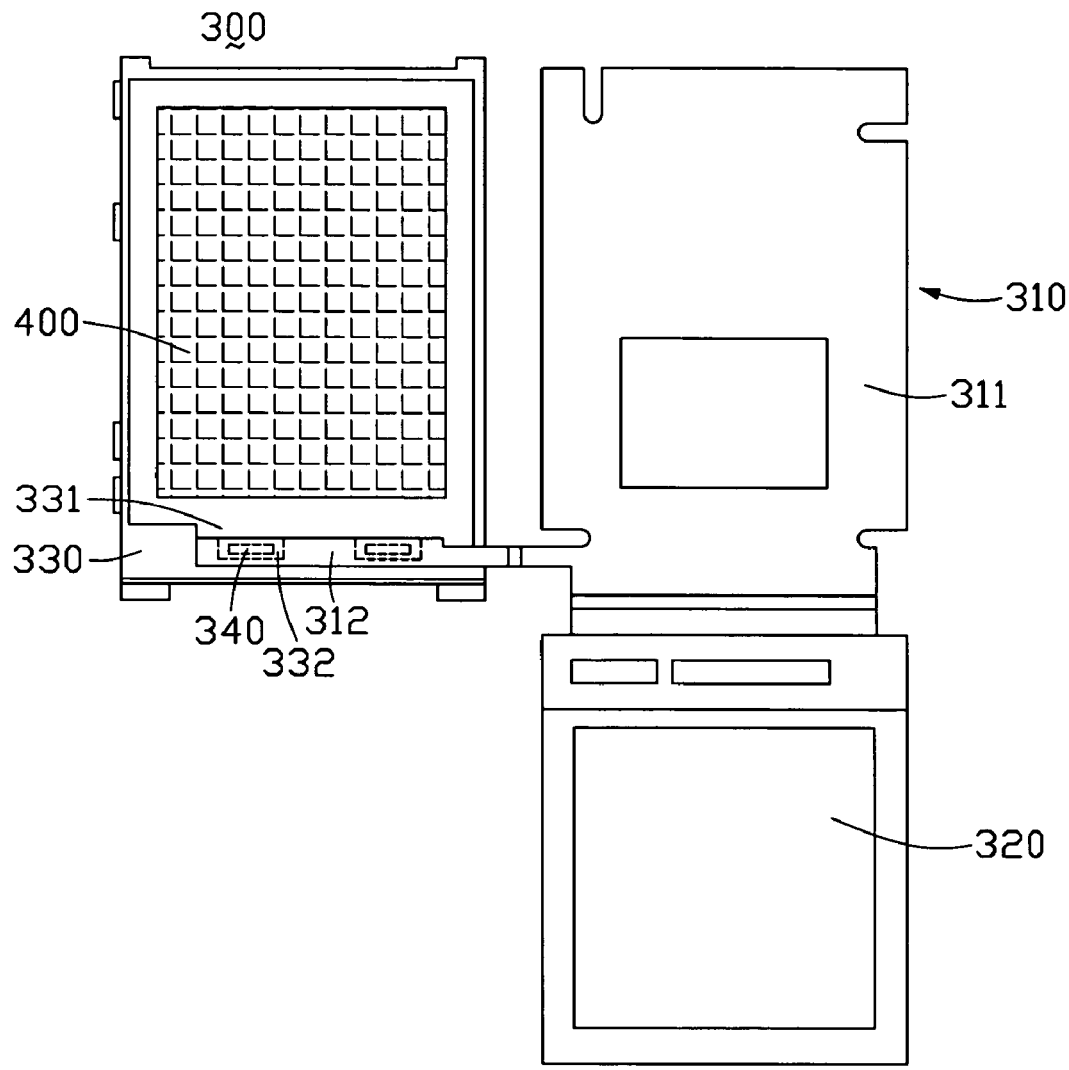
FIG. 6 is a schematic, top plan view of a conventional LCD device prior to assembly thereof, the LCD device including a light guide plate and two LEDs, the light guide plate having a light incident surface.
Figure 7:
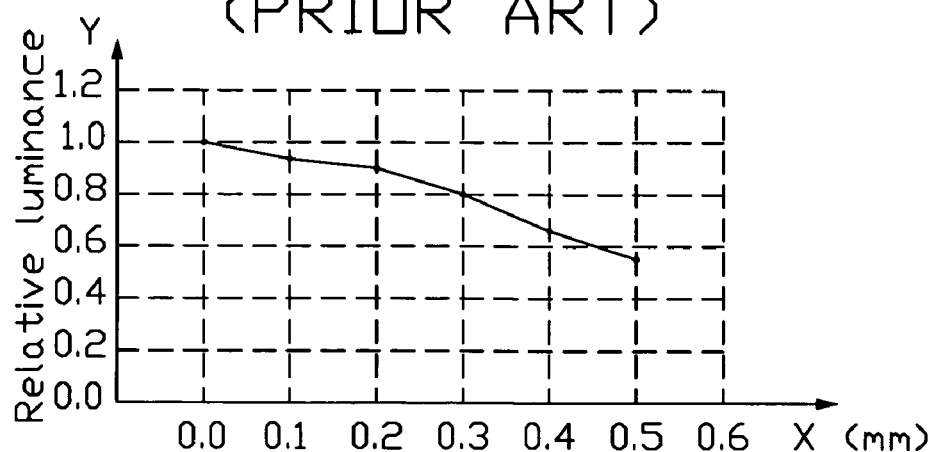
FIG. 7 is a graph showing relative emitting luminance ("Y") of the light guide plate of FIG. 6 varying as a function of a distance ("X") between the LEDs and the light incident surface of the light guide plate.

As seen in FIG. 4 and FIG. 5, the spring finger 506 presses the ear 566 of light guide plate 56 toward the radiation elements 59, so that the light incident surface 560 of the light guide plate 56 is held very close to or against the radiation elements 59. Thereby, distances between the radiation elements 59 and the light incident surface 560 are decreased or even eliminated. This enables the LCD device 100 to provide improved brightness and uniformity of emitting luminance.

In an alternative embodiment, the spring finger 506 can be formed at a middle of the fourth side wall 504. In such case, the ear 566 of the light guide plate 56 and the through-hole 556 of the frame 55 are located to correspond to the spring finger 506. In another alternative embodiment, the fourth side wall 504 of the bottom tray 50 can include two or more spring fingers 506 formed thereat. The spring fingers 506 may be symmetrically arranged relative to each other, or may have a same orientation. In either case, the frame 55 includes two or more through-holes 556 corresponding to the spring fingers 506, and the light guide plate 56 includes two or more ears 566 corresponding to the spring fingers 506.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
   a light guide plate comprising:
   a light incident surface;
   a side surface opposite to the light incident surface; and
   an ear formed at the side surface;
   a bottom tray comprising a spring element;
   a radiation element disposed adjacent to the light incident surface of the light guide plate; and
   a frame receiving the light guide plate and the radiation element, the frame comprising a through-hole corresponding to the spring element and the ear;
   wherein the spring element presses the light guide plate to abut the radiation element.

2. The backlight module as claimed in claim 1, wherein the spring element extends into the through-hole and presses the ear of the light guide plate.

3. The backlight module as claimed in claim 1, wherein the frame further comprises a plurality of extending arms extending toward the light incident surface of the light guide plate.

4. The bacldight module as claimed in claim 3, wherein the radiation element is disposed between two adjacent extending arms.

5. The backlight module as claimed in claim 1, wherein the spring element is formed on a side wall of the bottom tray that is adjacent to the side surface of the light guide plate.

6. The backlight module as claimed in claim 5, wherein the spring element is located at an end portion of the side wall of the bottom tray.

7. The backlight module as claimed in claim 5, wherein the spring element is located at a middle of the side wall of the bottom tray.

8. The backlight module as claimed in claim 6, wherein the bottom tray further comprises another spring element.

9. The backlight module as claimed in claim 8, wherein the spring elements of the bottom tray are symmetrically arranged relative to each other.

10. The backlight module as claimed in claim 1, wherein the radiation element comprises a light emitting diode.

11. The backlight module as claimed in claim 1, wherein the frame is made of plastic.

12. The backlight module as claimed in claim 1, wherein the bottom tray is made of metal.

13. The backlight module as claimed in claim 1, further comprising a printed circuit board, wherein the radiation element is attached on the printed circuit board.

14. The backlight module as claimed in claim 13, wherein the printed circuit board is a flexible printed circuit.

15. A backlight module, comprising:
   a light guide plate comprising:
   a light incident surface;
   a side surface opposite to the light incident surface; and
   an ear formed at the side surface;
   a bottom tray comprising a spring element;

a radiation element disposed adjacent to the light incident surface of the light guide plate; and a frame receiving the light guide plate and the radiation element;

wherein the spring element presses the ear of the light guide plate such that the light guide plate abuts the radiation element.

16. A liquid crystal display device, comprising:

a liquid crystal display panel; and a backlight module disposed adjacent to the liquid crystal display panel, the backlight module comprising:

a light guide plate comprising:

a light incident surface;

a side surface opposite to the light incident surface; and an ear formed at the side surface;

a bottom tray having a spring element;

a radiation element disposed adjacent to the light incident surface of the light guide plate; and a frame receiving the light guide plate and the radiation element, the frame comprising a through-hole corresponding to the spring element and the ear; wherein the spring element presses the light guide plate to abut the radiation element.

17. The liquid crystal display device as claimed in claim 16, wherein the spring element extends into the through-hole and presses the ear of the light guide plate.

18. The liquid crystal display device as claimed in claim 16, wherein the frame further comprises a plurality of extending arms extending toward the light incident surface of the light guide plate.

19. The liquid crystal display device as claimed in claim 18, wherein the radiation element is disposed between two adjacent extending arms.

20. The liquid crystal display device as claimed in claim 16, wherein the spring element is formed on a side wall of the bottom tray that is adjacent to the side surface of the light guide plate.

* * * * *